United States Patent Office 3,786,004
Patented Jan. 15, 1974

3,786,004
THERMOSETTING RESINOUS COMPOSITION
Akio Furuya, Yokohama, Makoto Hachiboshi, Ohtsu, Toshio Adachi, Osaka, and Masakatsu Uchida, Kamakura, Japan, assignors to Dainippon Toryo Co., Ltd. Leben Utility Co., Ltd., and Toyobo Co., Ltd., both of Osaka-shi, Japan
Filed Oct. 27, 1971, Ser. No. 192,893
Claims priority, application Japan, Dec. 29, 1970, 46/121,221; Dec. 30, 1970, 46/122,802
Int. Cl. C08g 58/10; C08j 1/20, 1/22
U.S. Cl. 260—2.5 N                          26 Claims

ABSTRACT OF THE DISCLOSURE

A thermosetting resinous composition comprising a vinyl chloride resin, an unsaturated polyester resin, a polymerization initiator, a reactive plasticizer and a member selected from the group consisting of the compounds of alkali metals of Group I in the Periodic Table, the compounds of elements of Group II in the Periodic Table and the compounds of lead, optionally together with a non-reactive plasticizer and/or a vinyl monomer, and a thermosetting resinous composition obtained by incorporating a bubbling material into the above composition.

BACKGROUND OF THE INVENTION (i) Field of the invention

This invention relates to a thermosetting resinous composition comprising a vinyl chloride resin, a reactive plasticizer, an unsaturated polyester resin, a polymerization initiator, and a member selected from the group consisting of the compounds of alkali metals of Group I in the Periodic Table, the compounds of elements of Group II in the Periodic Table and the compounds of lead, and to a thermosetting foamable resinous composition obtained by incorporating a bubbling material in the above thermosetting resinous composition.

(ii) Description of the prior art

In general, unsaturated polyester resin compositions which are used for making fiber-reinforced plastics and used as coating compositions comprise a resin derived from saturated and unsaturated dibasic acids, and a polyhydric alcohol, and a monomer such as styrene, acrylic acid ester and allyl alcohol ester.

It has been well-known in the art that these compositions are cured by incorporating therein a polymerization initiator such as an organic peroxide and then heating the resulting mixture, or by incorporating therein a polymerization initiator and a promotor such as a metal salt of naphthenic acid and then curing at room temperature.

Molded articles prepared from such unsaturated polyester resin compositions have the following defects:
(1) Strain arises because of great shrinkage at the time of curing.
(2) Hardness is considerably high, but brittle.
(3) Combustile.
(4) Yellowing or deterioration frequently occurs under ultraviolet rays.
(5) Since the ester linkage in the resin is readily hydrolyzed, the alkali- or boiling water-resistance is poor.
(6) Cracks or warps are easily formed in a thick portion, because of violent temperature elevation by the exothermic reaction at the time of curing.
(7) Further, in the resinous composition incorporated with a polymerization initiator and/or a promotor, the workability is very poor because of a short pot life.

In order to prepare molded articles easily from a vinyl chloride resin, there has been known a method comprising incorporating a plasticizer into a vinyl chloride resin powder for plastisol to form a polyvinyl chloride plastisol and heating the plastisol.

For example, a polyvinyl chloride plastisol comprising a reactive plasticizer selected from a lower aliphatic alcohol esters of acrylic or methacrylic acid, a vinyl chloride resin and a non-reactive plasticizer is disclosed in U.S. Pats. 2,943,952 and 3,066,110, British Pat. 694,444 and Japanese patent publication 10,732/67.

A polyvinyl chloride plastisol comprising a reactive plasticizer of a lower aliphatic alcohol ester of acrylic or methacrylic acid, a vinyl monomer and a vinyl chloride resin is disclosed in U.S. Pats. 2,849,332 and 3,133,825.

Further, combinations of a vinyl chloride resin with a non-reactive plasticizer and a vinyl monomer are disclosed in U.S. Pat. 2,918,736.

When these plastisols are molten and gelated under heating, there are obtained soft, elastic products having excellent flexibility. However, these molded products have, in general, the following defects:

(1) Extremely low hardness and low heat distortion temperature.
(2) Requiring high temperatures such as exceeding 180° C. for melting and gelation of the starting plastisols.
(3) Poor oil and solvent resistance.
(4) Poor stain resistance.
(5) Causing deterioration or softening in a material contacted with the molded article or film due to bleeding of the plasticizer contained therein.

Further, in order to obtain rigid molded articles or film film from polyvinyl chloride plastisols, it has been known to minimize the amount of the plasticizer necessary for imparting a flowability to the plastisols by (a) reducing the incorporation ratio of the plasticizer to a minimum level,
(b) using a plasticizer of a low viscosity having a low swelling property to the vinyl chloride resin, or
(c) incorporating a suitable amount of relatively coarse resin particles into the vinyl chloride resin.

However, the molded articles or film are defective in hardness compared with the rigid vinyl chloride resin products obtained from a vinyl chloride resin with or without a small amount of the plasticizer by kneading on hot rolls or extrusion-molding.

Still further, in order to form molded articles or film having improved hardness, solvent resistance, softening property and stain resistance, it has been proposed to substitute a part of or all of the plasticizer (such as di-. octyl phthalate) with a so-called reactive plasticizer having 1 to 3 double bonds in the molecule and being compatible with a vinyl chloride resin (such as diallyl phthalate and ethyleneglycol dimethacrylate) adding a small amount of a radical polymerization initiator and curing the resulting composition under heating. However, the molded articles or film prepared by the method is defective in hardness and softening point compared to those of known unsaturated polyester resins, since it does not contain any unsaturated polyester resin. Moreover, in comparison with conventional rigid vinyl chloride resin products, such composition is inferior in storage stability and has extremely low hardness and softening point. Further the reactive plasticizer used is expensive.

It has been tried to mix a small amount of an unsaturated polyester resin as a kind of reactive plasticizer with a vinyl chloride resin. For instance, molding compositions made by mixing the reactive plasticizer of an ester type such as fumaric acid esters with the vinyl chloride resin has been known in Japanese patent publications 8,659/64, 25,795/64, 26,276/54, 1,550/66 and 10,858/68.

There have been also known molding compositions comprising an unsaturated polyester resin, a vinyl chloride resin and styrene or the like (British Pat. 765,562 and French Pat. 1,510,442) and an unsaturated polyester resin and a vinyl acetate resin (Japanese patent publication No. 9,269/67).

At any rate, compositions obtained by mixing the unsaturated polyester resin with the vinyl chloride resin are highly viscous, and have poor compatibility. Further when they are mixed, the viscosity is abruptly increased and gelation occurs. It is also very difficult to carry out the processing or coating operation because of a very short pot life of the compositions. Moreover, products obtained by curing such compositions are opaque and brittle, whereby impractical.

For overcoming these disadvantages, there have been made proposals such as;

(a) a method comprising forming a low condensate polyester resin from maleic anhydride and a glycol such as butanediol, and partially esterifying the terminal acid group with a monohydric alcohol (Japanese patent publication 1,816/64), (b) a method comprising an unsaturated polyester resin obtained by modifying a low condensate polyester derived from maleic anhydride and glycolic acid with n-octanol (Japanese patent publication 11,142/61), and (c) a method comprising condensing vinyl chloride resin molecules with an unsaturated polyester. (Japanese patent publication 10,712/65.)

Each of these improvements gives a low condensation degree of modified polyester resins. Polyvinyl chloride plastisols incorporated with such resulting modified polyesters described above may be formed into molded articles or films having a high hardness. However, these polyvinyl chloride, plastisols are defective in that, when they are exposed to the air, the curing in the surface portion is slower than the curing in the interior portion, whereby molded articles prepared therefrom are brittle.

Since these compositions are liquid, their transportation or handling is troublesome and they have a tendency to overflow from molds at the time of press molding. Further, these compositions are defective in that, when they are heated at the time of press molding, their viscosity is lowered, and vinyl chloride resin particles in the compositions are precipitated and separated. Thus a uniformity of mechanical strength in molded products cannot be attained.

Further, when additives such as fillers and glass fibers are incorporated in these compositions, separation or precipitation of these additives as well as vinyl chloride resin particles can be seen and the resulting molded products frequently lack uniformity.

Known methods of making foam products from thermosetting resins include the following:

(1) A method comprising dissolving a volatile substance into a resin or adding a bubbling agent into the resin prior to curing thereof, and utilizing a gas formed by gasification, thermal decomposition or chemical reaction evolved during the curing of the resin.

(2) A method comprising incorporating and dispersing a gas into a resin by agitation or the like prior to curing of the resin.

(3) A method comprising a combination of above methods (1) and (2).

In thermosetting resins, for instance, unsaturated polyester resins, the stability of bubbles is extremely low and the bubbles forming cells are rapidly condensed or destroyed in several seconds to several minutes. Consequently, when a resin is foamed and then cured, foams are condensed and destroyed before gelation of the resin. Thus, it is difficult to obtain a foamed product of a low density having fine and uniform pores.

Further, even if it is intended to carry out the curing just after foaming of the unsaturated polyester resin, it is very difficult to make the time of the curing coincide with a suitable time after foaming.

In order to overcome such disadvantages, there has been proposed a method using a thixotropic agent such as cellulose acetate butyrate. It has been also known to add to an unsaturated polyester resin an acidic salt of a phosphoric acid ester containing no carboxylic acid ester linkage (Japanese patent publication 1,520/64). Moreover, there has been known a method of preparing foam products comprising forming an anhydrous mixture containing as main ingredients a polymeric resin and a substance capable of forming a gas upon contact with an acid, and adding thereto an aqueous emulsion (Japanese patent publication 2,075/64). However, foam products having sufficient properties cannot be obtained by these conventional methods.

Unsaturated polyester resin products are made lighter by adding thereto as a filler fine particles containing a gas or a volatile liquid, and these resin products are sometimes called "foam products." However, in these products, the fine particles are merely embedded in the resins, and they are present in the products independently and separately from one another while retaining the original state. Of course, in such products there are not formed stockade-like, continuous cells. Accordingly, cracks, warps and breakages are readily made during the curing of such resin products, and the cured products are inferior in chemical resistance and weather resistance and are easily combustible. Because of these defects, their use is naturally limited.

Compositions comprising as main ingredients the vinyl chloride resin, the reactive plasticizer and the unsaturated polyester resin take a liquid form. Therefore, their transportation or handling is inconvenient. In addition, they are defective in that a gas escapes from bubbles due to their low viscosity prior to completion of curing, and formed cells disappear, cellular layers are fused again, whereby the ratio of foaming (expansion) cannot be heightened and that products lacking uniformity are formed.

The defect of the low viscosity in the compositions may be improved to some extent by increasing the amounts of fillers such as calcium carbonate, but mechanical properties of the foamed products are not satisfactory. In the compositions of the foregoing type, since the viscosity is extremely lowered while the compositions are heated to the curing temperature, separation or sedimentation of the uniformly dispersed vinyl chloride resin and pigment or other additives frequently occurs, whereby it leads to non-uniform foaming and deviation of mechanical properties in the products.

Still further, when a dispersible bubbling agent is incorporated, foamed products having uniform cells cannot be obtained because of flotation or sedimentation of the bubbling agent.

It has also been known to make cellular products by mixing a thermosetting rubbery material with a zeolite substance containing adsorbed gas and heating the mixture to discharge the gas therefrom (Japanese patent publication 1640/58). Also by this method, however, there cannot be obtained foamed products having uniform cells.

Techniques concerning the above-mentioned unsaturated polyester resins, polyvinyl chloride plastisols and foamable resinous compositions have recently been improved very rapidly, but because of the foregoing defects and disadvantages, their application range is much limited practically.

DESCRIPTION OF THE PRESENT INVENTION

The primary object of this invention is to provide a thermosetting resinous composition comprising a vinyl chloride resin, a reactive plasticizer, an unsaturated polyester resin, a polymerization initiator, and a member selected from the group consisting of the compounds of alkali metals of Group I in the Periodic Table, the compounds of elements of Group II in the Periodic Table and the compounds of lead.

Another object of the invention is to provide a thermosetting foamable composition comprising the above thermosetting composition and a bubbling material incorporated therein.

The vinyl chloride resin to be used in the composition of this invention includes a homopolymer of vinyl chloride and a copolymer of vinyl chloride with other monomers copolymerizable therewith. Namely, it includes copolymers of vinyl chloride with vinyl acetate, vinyl propionate, methyl methacrylate, butyl acrylate, vinylidene chloride, acrylonitrile, vinyl ether, diethyl maleate, acrylic acid, methacrylic acid, maleic anhydride and the like. It further includes a saponified product of a copolymer of vinyl chloride with vinyl acetate.

For obtaining molded articles having excellent physical properties, it is important that such homopolymer or copolymer should be highly polymerized, and it is generally preferred to use a homopolymer or copolymer of vinyl chloride having a degree of polymerization ranging from 500 to 2500. Preferable average particle sizes of the vinyl chloride resin are from 0.05 to 50 microns, especially from 0.2 to 2 microns. It is most preferred to use a homopolymer of vinyl chloride or a copolymer of vinyl chloride with vinyl acetate containing 95–99% by weight of vinyl chloride, which has been prepared for plastisol. In order to obtain a plastisol of low viscosity, it is possible to use a coarse vinyl chloride resin having a particle size of 5–100 microns as an extender in combination with the homopolymer or copolymer.

It be preferred that the vinyl chloride resin is incorporated in an amount of 5–60% by weight based on the total composition. In case the vinyl chloride resin is incorporated in an amount of less than 5% by weight, flexibility and flame resistance cannot be attained in the resulting product. At a vinyl chloride resin content not less than 60% by weight, the viscosity of the composition is too high and its workability is not good. Further, the heat distortion temperature of the product is lowered and it cannot be practically applied.

The reactive plasticizer to be used in the composition of this invention is an acrylic acid ester plasticizer expressed by the general formula wherein A is a residue of a compound having at least two hydroxyl groups at the molecule ends, or a compound having at least one ester or ether linkage in the molecule and at least two terminal hydroxyl groups; X stands for a hydrogen or halogen atom or an alkyl group such as methyl and ethyl; and n and m are integers of 1 to 3. Examples of a reactive plasticizer of the acrylic acid ester type, are:

ethyleneglycol dimethacrylate,
propyleneglycol dimethacrylate,
1,3-butanediol dimethacrylate,
1,4-butanediol dimethacrylate,
2,3-butanediol dimethacrylate,
2-ethyl-1,3-hexanediol dimethacrylate,
1,5-pentanediol dimethacrylate,
1,6-hexanediol dimethacrylate,
neopentylglycol dimethacrylate,
glycerin trimethacrylate,
dimethacryl (bis-dimethyleneglycol) phthalate,
dimethacryl (bis-diethyleneglycol) phthalate,
dimethacryl (bis-diethyleneglycol) maleate,
tetramethacryl (bis-glycerin) phthalate,
triethyleneglycol dimethacrylate,
tetramethyleneglycol dimethacrylate,
polyethyleneglycol dimethacrylate, and
trimethylolpropane trimethacrylate.

In addition, there may be used allyl-type reactive plasticizers such as allyl acrylate, triallyl cyanurate, diallyl maleate, diallyl itaconate, diallyl hebacate, diallyl adipate, diallyl glycolate, triallyl aconitate, diallyl monooctyl phosphate, triallyl phosphate, diallyl isophthalate and diallylbenzene phosphate.

It is also possible to use as the reactive plasticizer alkyl esters of α,β-unsaturated acids in which the alkyl radical has preferably 4–16 carbon atoms, such as dibutyl maleate, dicyclohexyl maleate, dioctyl maleate, dibutyl fumarate, dicyclohexyl fumarate, dioctyl fumarate, dibutyl itaconate, dioctyl itaconate, cyclohexyl acrylate, octyl acrylate, lauryl acrylate, capryl acrylate, cyclohexyl methacrylate, octyl methacrylate, lauryl methacrylate and capryl methacrylate. These reactive plasticizers may be used in combination.

The content of the reactive plasticizer in the composition of this invention is not more than 60% by weight, preferably not less than 2% by weight, when the composition does not contain a non-reactive plasticizer or vinyl monomer. In case the composition comprises a non-reactive plasticizer and/or a vinyl monomer in addition to the reactive plasticizer, the content of the reactive plasticizer is not more than 50% by weight, preferably not less than 2% by weight. If the content of the reactive plasticizer exceeds 60% by weight (or 50% by weight), the storage stability of the composition is lowered, and the mechanical properties of the product are not improved.

Of the foregoing reactive plasticizers of the acrylic acid ester type, the allyl type and α,β-unsaturated acid alkyl ester type are found to exhibit an effect of increasing the compatibility between the vinyl chloride resin and the unsaturated polyester resin, and further effects of improving mechanical properties, heat distortion temperature and transparency of the molded article. However, in view of the curing rate, reactive plasticizers of the acrylic acid ester type are most preferred, because they exhibit the highest curing rate among the above-mentioned reactive plasticizers.

It is also possible to substitute a part of the reactive plasticizer with a non-reactive plasticizer. By such substitution, there are brought about various advantages. For instance, the curing rate can be adjusted and the exothermic reaction temperature can be appropriately controlled, whereby occurrence of cracks can be prevented in preparing molded articles of a complicated configuration. Further, the impact resistance of the product can be improved.

As the unsaturated polyester resin to be used in the composition of this invention, there may be used commercially available ones for preparing molded articles, decorative plates, laminated plates, coating and the like.

More specifically, there may be used unsaturated polyester resins formed by condensation of unsaturated dibasic acids with polyhydric alcohols. Typical examples of the unsaturated dibasic acid include maleic acid, maleic anhydride and fumaric acid. Itaconic acid is also usable in some cases.

In general, a part of the unsaturated dibasic acid is replaced by a saturated aliphatic or aromatic dibasic acid such as adipic acid, sebacic acid, phthalic anhydride, isophthalic acid, terephthalic acid and chlorinated phthalic acid.

As the polyhydric alcohol there may be used, for instance, ethyleneglycol, diethyleneglycol, propyleneglycol, dipropyleneglycol, 1,6-hexanediol, 1,3-butanediol, 2,3-butanediol, neopentylglycol, hydrogenated bisphenol-A, and 2,2-di(4-hydroxypropoxyphenyl)propane.

In this invention it is preferable to use as the polyhydric alcohol, neopentylglycol alone or in combination with ethyleneglycol, diethyleneglycol, propyleneglycol, dipropyleneglycol or 1,6-hexanediol. In the latter case, it is preferred that the polyhydric alcohol component contains at least 30 mole percent of neopentylglycol. It is also preferable to use 1,6-hexanediol or a combination of at least 30 mole percent of 1,6-hexanediol and a balance of at least one of the other polyhydric alcohol comprising ethyleneglycol, diethyleneglycol, propyleneglycol, dipropyleneglycol and neopentylglycol. The use of such a combination of polyhydric alcohols improves the compatibility among the unsaturated polyester resin, the vinyl chloride resin, the vinyl monomer and the reactive plasticizer and imparts a composition in which the viscosity is hardly changed even after the passage of time and which can be, therefore, stored very stably.

Figure 3:
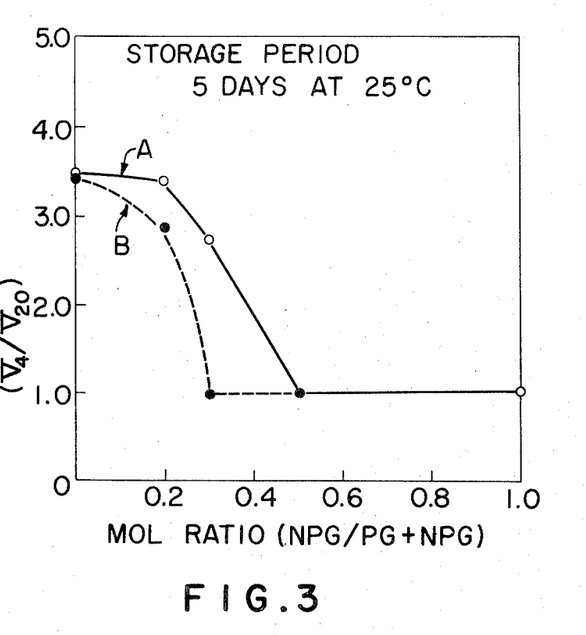
FIG. 3 is a graph showing the thixotropic property of the compositions comprising a vinyl chloride resin, a reactive plasticizer, a vinyl monomer and unsaturated polyester resins which are produced by changing the mole ratio of neopentylglycol in the total amount of polyhydric alcohols.

FIG. 3 shows a viscosity change of the compositions which comprise the unsaturated polyester resin, the vinyl chloride resin, the vinyl monomer and the reactive plasticizer.

Curve A represents a composition mixed with the unsaturated polyester resin which has been produced from the reaction of one mole of phthalic anhydride, one mole of maleic anhydride and 2.2 moles of polyhydric alcohols.

Curve B represents a composition mixed with the unsaturated polyester resin which has been produced from the reaction of one mole of isophthalic acid, one mole of maleic anhydride and 2.2 moles of polyhydric alcohols.

The polyhydric alcohols used in the above consist of neopentylglycol (NPG) and propyleneglycol (PG), and the content of NPG has been varied.

The figure clearly illustrates the thixotropic property of the compositions (after storage of 5 days at 25° C.) by measuring the ratio of 4 r.p.m. ($V_4$) and 20 r.p.m. ($V_{20}$) using the Brookfield viscometer.

It is desirable that the unsaturated polyester resin have an average degree of condensation of at least 4 and a number average molecular weight of 1000 or more. In case an unsaturated polyester resin having a number average molecular weight of less than 1000 is used, mechanical properties of the final cured product are poor. The number average molecular weight referred to herein is one determined by the ebullioscopic method employing an Ebulliometer.

It is preferred that the unsaturated polyester resin be incorporated in the composition of the invention in an amount of 5-60% by weight. The improvement of mechanical strength cannot be attained in an amount less than 5% by weight. In an amount more than 60% by weight, it is also difficult to obtain a composition having sufficient fluidity, and the mechanical strength of the final product is poor.

In case the present composition is used for a foamable composition, it is especially preferred to use the unsaturated polyester resin synthesized by employing isophthalic acid as the unsaturated dibasic acid in view of the ratio of foaming, the uniformity of cells and the foaming reproducibility. Unsaturated polyester resins prepared by employing other unsaturated dibasic acids are inferior in the foregoing points.

Examples of polymerization initiators which may be used in this invention, are organic peroxides such as acetyl peroxide, methyl ethyl ketone peroxide, lauryl peroxide, benzoyl peroxide, tert.-butyl perbenzoate, ditert.-butyl peroxide, hydroxycyclohexyl hydroperoxide and cumene hydroperoxide; and azo-type catalysts such as $\alpha,\alpha'$-azobisisobutyronitrile. These polymerization initiators may be used in combination.

In accordance with the present invention, at least one compound selected from the compounds of alkali metals of Group I in the Periodic Table, the compounds of elements of Group II in the Periodic Table and the compounds of lead is incorporated. Specific examples of such compound include oxides such as beryllium oxide, magnesium oxide, strontium oxide, barium oxide and lead oxide; hydroxides such as lithium hydroxide, sodium hydroxide, potassium hydroxide, rubidium hydroxide, cesium hydroxide, francium hydroxide, beryllium hydroxide, magnesium hydroxide, calcium hydroxide, strontium hydroxide, barium hydroxide and lead hydroxide; organic acid salts such as beryllium acetate, magnesium acetate, calcium acetate, strontium acetate, barium acetate, zinc acetate, lead acetate, beryllium formate, magnesium formate, calcium formate, strontium formate, barium formate and lead formate; and alkoxides such as lithium methylate, sodium methylate and potassium methylate.

It is preferred that the above compound be incorporated in the composition of this invention in an amount of 0.1–10% by weight. When the agent is incorporated in an amount exceeding 10% by weight, the workability of the composition and the mechanical strength of the final product are lowered.

The action of the compounds of an alkali metal of Group I, an element of Group II or lead is mainly based on cations of such metals. More specifically, these metals are linked with anions of the polyvinyl chloride resin or unsaturated polyester resin to form a structure which is cross-linked at room temperature but which is made fluid with a structural viscosity under suitable pressure at temperatures approximating the molding temperature at the final molding step, whereby the composition can be readily molded. The above compounds are especially effective for improving the fluidity of the composition at high temperatures.

Accordingly, these compounds are hereinafter called "thickening agents."

It has not been known to add this type of thickening agent to the composition which comprises the unsaturated polyester resin, the vinyl chloride resin and the reactive plasticizer.

When the thickening agent is added, there is no sedimentation or separation of the particles of vinyl chloride resin, the bubbling materials or reinforcing materials, whereby there can always be obtained very uniform products.

These features are very important in the molded or foamed products which require uniformity of mechanical strength or uniformity of foaming.

By the term "bubbling material" used herein, there is meant fine particles containing gas, a low boiling liquid or an easily gas-forming solid. It is important that these fine particles should discharge gas at a temperature below the gelation temperature of the composition of this invention. Examples of such fine particles, are resinous substances such as phenol, epoxy, polyethylene, polyurethane, polypropylene, polystyrene, polyacrylic, polyester, polyamide, polybutadiene, polyisoprene, silicone and cellulose type resins, gelatin, polyvinyl alcohol, vinyl chloride-ethylene copolymer resins and inorganic compounds such as glass.

The gas contained in the fine particles may include inert gases such as helium, neon and argon; other gases such as air, nitrogen, carbon dioxide gas, ammonia, ethane, propane, butane gas and Freon (trade name made by E. I. du Pont de Nemours & Co.). The liquid contained in the fine particles may include saturated hydrocarbons such as pentane, hexane and heptane; low boiling solvents or liquids such as petroleum ether, benzene, carbon tetrachloride and water.

The easily gas-forming solid in the fine particles may include inorganic compounds capable of discharging gas under heating by decomposition, such as ammonium carbonate and sodium bicarbonate; azo compounds such as dinitrosopentamethylene tetramine, azobisisobutyronitrile, toluenesulfonyl hydrazide derivatives and p-toluenesulfonyl azide; and in addition substances capable of sublimation such as camphor and naphthalene.

Specific examples of the bubbling material are (1) hollow fine particles of 5µ–2 mm. composed of a glass or resinous substance containing inert gas, noncombustible gas or lower saturated hydrocarbon, for instance, glass microballoons, shirasu-glass microballoons, perlite, phenolic microballons, butane-containing polystyrene beads;
(2) microcapsules of resinous substances containing a solid or liquid selected from the above-mentioned low boiling point liquids, inorganic compounds, azo compounds and the substances capable of sublimation or a mixture of such solids or liquids optionally together with a small amount of gas; and
(3) particles of molecular sieve type adsorbents capable of adsorbing selectively a great amount of the inert gas, the non-combustible gas, the lower saturated hydrocarbon or the low boiling point liquid such as recited above, for instance, particles of zeolite.

Physical properties of the glass microballoons (sold under the trademark of "Microballoon IG–101" by Emerson & Cuming, Inc.) and the shirasu-glass microballoons (made by Kyushu Kogyo Shikenjo) mentioned in (1) are tabulated below:

As the non-reactive plasticizer there may be used any of the conventional non-reactive plasticizers for polyvinyl chloride, such as phthalic acid esters, e.g., dibutyl phthalate, diamyl phthalate, dimethoxyethyl phthalate, dibutoxyethyl phthalate, dicyclohexyl phthalate, dihexyl phthalate, diheptyl phthalate, butylotcyl phthalate, di (n-octyl) phthalate, di-(2-ethylhexyl) phthalate, diisooctyl phthalate, didecyl phthalate, didodecyl phthalate and butylbenzyl phthalate; phosphates, e.g., alkyl diphenyl phosphate and tricresyl phosphate; and others, e.g., dicapryl, didecyl and di-2-ethylhexyl esters of adipic acid, succinic acid, azelaic acid and sebasic acid. In addition, customary saturated polyester and epoxy-type plasticizers for ordinary vinyl chloride resins, and chlorinated paraffins may be used in combination with the above-exemplified non-reactive plasticizers. It is preferable to use plasticizers which do not affect the fluidity or storage stability of the polyvinyl chloride plastisol. These plasticizers may be used in the form of an admixture of two or more of them.

The non-reactive plasticizer is incorporated in the composition of the invention in an amount not more than 50% by weight, preferably 5–50% by weight. By incorporation of the non-reactive plasticizer in an amount not more than 50% by weight, it is possible to improve the fluidity and the viscosity of the composition formed from the unsaturated polyester resin and the vinyl chloride resin, and to control the curing rate of the composition, and to improve the flexibility of the molded article. When more than 50% by weight, the resulting product is brittle and mechanical properties are poor.

The non-reactive plasticizer is incorporated in the composition of the invention for adjusting the viscosity of the

| | Shirasu-glass microballoon | Microballoon IG–101 |
|---|---|---|
| Appearance | White to faintly brown powder | White powder. |
| Composition | Aluminum silicate | Sodium borosilicate. |
| Apparent density (–) | 0.33–0.67 | 0.33. |
| Volume density (–) | 0.14–0.32 | 0.22. |
| Particle size distribution (µ) | 30–600 | 10–250. |
| Average particle size (µ) | | 65. |
| Particle wall thickness (µ) | 6–14 | 2. |
| Softening initiation temperature (° C.) | 900–1,000 | 480. |
| Melting point (° C.) | 1,200–1,300 | 760. |
| Heat conductivity (kcal./m.h., ° C.) | 0.07 | 0.056. |
| Hygroscopicity (24 hours, percent) | 0.08 | 2.8. |

(The preparation of the shirasu-glass microballoons is detailed in Engineering Materials (Kogyo Zairyo), vol. 19, No. 8, pp. 84–89.)

Any of bubbling materials (1), (2) and (3) are effectively used in the invention. In view of the ratio of foaming, the uniformity in the structure of stockade-like cells and the reproducibility of foaming, however, the use of bubbling materials of type (1) is most preferred. Other bubbling materials of types (2) and (3) are a little inferior in the above points.

The bubbling material is incorporated in the composition of the invention in an amount of 1–50% by weight, especially 5–30% by weight.

A vinyl monomer and/or a non-reactive plasticizer may be incorporated into the composition of this invention, if desired.

The vinyl monomer referred to in this invention includes monomers having a double bond in the molecule. Examples of such monomers are styrene, vinyl acetate, methyl methacrylate, butyl acrylate, chlorostyrene, divinyl benzene and acrylonitrile.

The amount of the vinyl monomer to be incorporated in the composition of the invention is not more than 40% by weight, preferably more than 2% by weight. When more than 40% by weight, the volume shrinkage of the resulting molded product is high, whereby cracks and warps occurs.

The vinyl monomer is incorporated for the purpose of adjusting the viscosity of the composition and improving hardness, chemical resistance and mechanical properties of the resulting molded product.

composition, controlling the exothermic reaction temperature at the time of curing and improving the flexibility of thet resulting molded article.

Typical instances of proportions of the vinyl chloride resin, the unsaturated polyester resin, the reactive plasticizer, the non-reactive plasticizer, the vinyl monomer, the polymerization initiator, the thickening agent and the bubbling material in the thermosetting composition of this invention are as follows:

(I) BASIC RESINOUS COMPOSITIONS OF THIS INVENTION (1) A thermosetting resinous composition comprising 5–60% by weight of the vinyl chloride resin, 5–60% by weight of the unsaturated polyester resin, not more than 60% by weight of the reactive plasticizer, 0.1–10% by weight of the thickening agent, and 0.2–3% by weight of the polymerization initiator.

(2) The thermosetting resinous composition as set forth in (1), wherein the reactive plasticizer is incorporated in an amount not more than 50% by weight and the non-reactive plasticizer is incorporated in an amount not more than 50% by weight.

(3) The thermosetting resinous composition as set forth in (1), wherein the reactive plasticizer is incorporated in an amount not more than 50% by weight and the vinyl monomer is incorporated in an amount not more than 40% by weight.

(4) The thermosetting resinous composition as set forth in (2), which comprises not more than 40% by weight of the vinyl monomer.

(II) RESINOUS COMPOSITIONS INCLUDING A BUBBLING MATERIAL (1) A thermosetting foamable resinous composition which comprises 5-60% by weight of the vinyl chloride resin, 5-60% by weight of the unsaturated polyester resin, not more than 60% by weight of the reactive plasticizer, 0.1-10% by weight of the thickening agent, 0.2-3% by weight of the polymerization initiator and 1-50% by weight of the bubbling material.

(2) The thermosetting foamable resinous composition as set forth in (1), wherein the reactive plasticizer is incorporated in an amount not more than 50% by weight and the non-reactive plasticizer is incorporated in an amount not more than 50% by weight.

(3) The thermosetting foamable resinous composition as set forth in (1), wherein the reactive plasticizer is incorporated in an amount not more than 50% by weight and the vinyl monomer is incorporated in an amount not more than 40% by weight.

(4) The thermosetting foamable resinous composition as set forth in (2), which comprises not more than 40% by weight of the vinyl monomer.

In compositions of (I)-(3), (I)-(4), (II)-(3) and (II)-(4), if the proportion of the vinyl monomer exceeds 40% by weight, the exothermic reaction temperature is too high at the time of curing, whereby the volume shrinkage is too large and shrinkage distortion occurs. Further, the mechanical strength and chemical resistance of the resulting product is poor.

In compositions of (I)-(2), (I)-(4), (II)-(2) and (II)-(4), if the proportion of the non-reactive plasticizer exceeds 50% by weight, the hardness, chemical resistance and other properties of the final product are lowered.

The main components of the composition of this invention are blended, for instance, by the following methods.

(1) The method comprising dispersing vinyl chloride resin particles into the reactive plasticizer or a mixture of the reactive plasticizer with the non-reactive plasticizer according to the known technique to form the polyvinyl chloride plastisol, and mixing the polyvinyl chloride plastisol with (a) a solution of the unsaturated polyester resin in the reactive plasticizer, (b) a solution of the unsaturated polyester resin in the vinyl monomer, or (c) a mixed solution of the unsaturated polyester resin, the reactive plasticizer and the vinyl monomer.

(2) The method comprising dispersing the vinyl chloride resin powder directly in (a) a solution of the unsaturated polyester resin in the reactive plasticizer, (b) a solution of the unsaturated polyester resin in the vinyl monomer, or (c) a mixed solution of the unsaturated polyester resin, the reactive plasticizer and the vinyl monomer.

In order to improve the storage stability of the composition, for instance, by preventing the viscosity increase during storage, it is preferable to adopt a method comprising mixing the vinyl chloride resin with the reactive plasticizer, the non-reactive plasticizer or a mixture of them so as to cover the surface of the vinyl chloride resin powder with the plasticizer, and then mixing the same with the unsaturated polyester resin solution containing the vinyl monomer and other ingredients. When such method is adopted, direct contact of the vinyl chloride resin with the vinyl monomer having a relatively high dissolving power can be prevented, and therefore, the dissolution or swelling of the vinyl chloride resin does not occur during storage, and the composition exhibits an excellent storage stability.

The polymerization initiator, the bubbling material and the thickening agent are uniformly blended into the resulting mixture. The curing of the resulting composition is generally carried out at 60-180° C. under a pressure of 0-300 kg./cm.$^2$ for 10 seconds to 1 hour. By the curing treatment, the reactive plasticizer and the unsaturated polyester are cross-linked independently or mutually, whereby the gel of the vinyl chloride resin or the non-reactive plasticizer is confined by the formed net-like structure, and the hardness and strength of the cured product can be increased.

The above phenomena is also observed in the composition including the bubbling material. Even at a relatively low curing temperature, for instance, about 120° C., the unsaturated polyester resin, the reactive plasticizer and the vinyl monomer are cross-linked. The interior temperature of the molded composition is increased by the heat of polymerization generated at the time of curing and therefore, the curing is accomplished in a very short time even when a cured product of a great thickness is intended.

Coincidentally, the discharging of gas by melting or decomposition of the bubbling material, and the desorption of the adsorbed gas occur. In the composition of this invention, a lot of heat of polymerization is stored in the interior portion. Thus, in the interior portion of the molded composition the melting or decomposition of the bubbling material and the discharging of gas occur prior to the cross-linking of the composition, thereby forming a layer of stockade-like, continuous cells having a diameter of 0.5-20 mm.

In the surface portion i.e., in a depth of up to several millimeters from the surface, the cross-linking and the curing of the composition are accomplished before the melting or the decomposition of the bubbling material. Thus, the discharging of gas does not occur sufficiently, whereby formation of stockade-like continuous cells is prevented and there is formed a dense, uniform skin layer of a low ratio of foaming. In view of such foaming mechanism, it is important that the resinous composition should have an appropriate fluidity which will not inhibit the foaming during the curing and such an appropriate viscosity which will prevent disappearance of formed cells which is caused by breakages of resin films formed in the vicinity of the cells.

The foaming and curing mechanism of the bubbling material-containing composition of the invention will now be detailed by referring to accompanying drawings.

Figure 1:
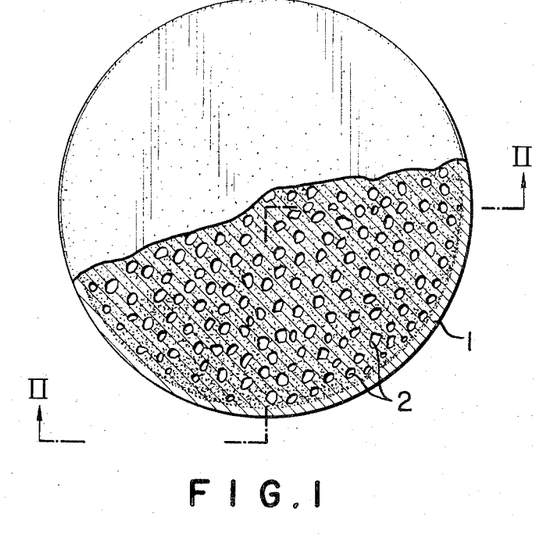
FIG. 1 is a plan view partially cut away illustrating a foam product obtained by charging a composition of this invention into a round mold and foaming it under heating.
Figure 2:
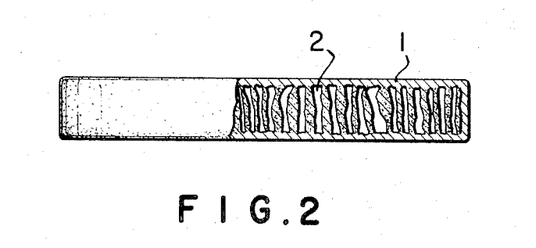
FIG. 2 is an elevational view partially cut away, taken along the line II—II of FIG. 1.

(1) The composition of the invention is first placed in a suitable mold, and heated at a temperature of 50-180° C. The part subjected to direct contact with the mold is rapidly heated and cured by the cross-linking reaction. At this part, the curing occurs at a higher rate than the decomposition and the melting of the bubbling material and the discharge of gas. Therefore, the composition is cured and solidified, and a formation of bubbles is inhibited. Thus, there is formed a dense skin layer (1) having a low foaming ratio.

(2) In the interior part of the composition which is not in direct contact with the mold, the composition is gradually heated by heat transfer, whereby its fluidity becomes high. At the same time the discharge of gas which will bring about the formation of the bubbles occurs due to heating of the bubbling material.

(3) Further, particles of the vinyl chloride resin contained in the composition are also subject to heating, whereby they are swollen, softened or melted with the reactive plasticizer, the non-reactive plasticizer, the vinyl monomer, etc., and the composition shows a high viscosity. Therefore, the bubbles are not destroyed nor do they disappear. The bubbles move upwardly in the composition and leave hollow stockade-like voids (2).

(4) Then, the cross-linking reaction occurs in the highly viscous resin holding therein the stockade-like voids (2), and the resin loses fluidity and is cured in the state that the bubbles are completely kept in the resin.

During the above-mentioned foaming and curing procedures, the presence of a suitable amount of a volatile liquid substance, for instance, the vinyl monomer or an ordinary solvent, is effective for increasing the ratio of foaming. Such volatile liquid substance is heated during the foaming and curing steps, and its temperature reaches the boiling point thereof. In this state, it is thought that the bubbling material exhibits a zeolite-like action in conventional boiling and thus promotes the gasification of the volatile liquid component, thereby increasing the amount of gas for foaming.

However, an ordinary solvent is condensed and left in the resulting foam product after the curing, and results in lowering of the mechanical properties of the product and affords an unpleasant smell. For these reasons, use of ordinary solvents is not preferred. However, since the vinyl monomers have no such defects, they are preferably incorporated into the composition.

In ordinary unsaturated polyester resins or diallyl phthalate resins, which are free of the vinyl chloride resin, a suitable fluidity and a balance between the discharge rate of gas and the rate of the cross-linking reaction cannot be attained. Therefore, it is impossible to obtain a foamed product having a high ratio of foaming and the specific stockade-like structure of uniform cells.

Further, in conventional polyvinyl chloride plastisols, the heating must be effected at temperatures exceeding 180° C. for accomplishing the curing and foaming, and carried out for a very long time so as to melt the interior portion of the composition, when thick molded articles are desired.

In the composition of this invention, the unsaturated polyester resins polymerize with the reactive plasticizers or the vinyl monomers even at a relatively low temperature such as 60–180° C., and the heat generated by this polymerization reaction increases the temperature of the interior portion of the molded composition. Further, the plasticizers or the vinyl monomers contained in the composition assist the melting of the vinyl chloride resins and heighten its workability. Accordingly, in the composition of the invention, the melting and curing can be accomplished in a short time even in the case of a thick molded article.

In addition, the violent heat generation as is seen in the molding and curing of ordinary unsaturated polyester resins is not brought about during the molding and curing of the composition of the invention. Therefore, occurrence of extreme shrinkage, shrinkage distortion and formation of cracks or the like can be prevented.

In short, the resinous composition of the invention and molded articles therefrom have the following advantages over the conventional unsaturated polyester resins or the vinyl chloride resins and the molded articles therefrom:

(1) Since the composition is in the semi-gelatinous or putty-like state, handling and packing are performed very easily.

(2) Since it is in the semi-gelatinous state, separation or sedimentation of resin, pigment, reinforcing material, and other additives does not occur during storage and the quality of the composition is kept constant.

(3) In the matched metal die molding, a good flow is attained by heating. Color unevenness does not occur and the composition exhibits an excellent workability for molding.

(4) The composition exhibits a lower volume shrinkage at the time of molding than the conventional unsaturated polyester resins.

(5) The exothermic reaction upon curing is milder than that of the conventional unsaturated polyester resins.

(6) The gelation and curing of the resin can be accomplished at lower temperatures than that of the conventional polyvinyl chloride plastisols.

(7) The cured and molded products are excellent in mechanical properties such as hardness and elasticity, and in chemical properties such as heat resistance, water resistance, chemical resistance, weather-resistance and stain resistance.

(8) The cured products are not so easily combustible, and exhibit excellent flame resistance.

(9) The cured products are characterized by the specific cellular structure composed of a dense, surface skin layer, and an inner layer of stockade-like, continuous cells. They have a low density and a high distortion temperature, and have excellent mechanical properties due to such specific structure.

It is possible to mix in the composition of the invention reinforcing materials, fillers, stabilizers, pigments, dyestuffs, lubricants, releasing agents and other additives, if desired.

The composition of the invention may be molded mainly by matched metal die molding, transfer molding, injection molding and casting molding, and the thus obtained films, sheets, cast products, laminated plates and composite reinforced plastics mixed with glass fibers or the like. Each of them exhibits a high heat distortion temperature and has excellent mechanical properties.

In the art of molding of reinforced plastics, the mechanization of the molding process has been attempted and developed for increasing the manufacturing efficiency. Thus, for instance, a sheet molding compound or a bulk molding compound is preferably applied in the art. The composition of this invention is of course very suitable for such a molding method.

More specifically, the composition of the invention can be applied to a deep drawing compared to conventional sheet molding compound. In comparison with a conventional bulk molding compound, the composition of the invention gives molded products which have excellent dimensional stability at the time of curing and surface smoothness.

Molded products, which have smooth surface, can be produced by hot-press molding or in a transfer molding press, since the composition can be easily controlled in viscosity and has excellent fluidity under heating prior to complete curing.

Because of the low volume shrinkage, the composition of this invention is especially suitable for press molding. It is possible to incorporate reinforcing materials such as glass fibers, asbestos, carbon fibers, boron fibers, metallic fibers, synthetic fibers and natural fibers into the composition of the invention. These reinforcing materials hardly come to the surface of the resulting molded article, but there can be obtained molded articles having excellent dimensional stability and substantially free of cracks or warps.

Laminated molded articles can be formed from the composition of the invention by impregnating the above-mentioned reinforcing materials with the composition of the invention, winding them around a mold to form a laminate of a desired thickness on the mold, and curing the laminate under heating, optionally followed by releasing the cured laminate from the mold. In carrying out the preparation of laminated products by this method, when the first layer containing the thickening agent is prepared and the second layer containing the bubbling material is overlapped thereon and further the third layer the same as the first layer is overlapped thereon to form a laminate assembly, there can be obtained a composite laminate molded article having a foamed layer sandwiched between non-foamed layers by heating and curing the laminate assembly. It is also possible to obtain sound-absorbing and heat-insulating composite laminate plates by coating the composition of the inventing on a substrate plate such as plywood, hard board, chip board, wood wool board, asbestos plate or slate plate and curing the coated composition under heating.

Still further, since the composition of the invention is the vinyl chloride resin-containing thermosetting resin comprising as the main ingredient the unsaturated polyester resin, it is possible to bond articles of the composition of the invention to each other or to articles of other known vinyl chloride resin because of the thermoplasticity and adhesive property in the fused state of the vinyl chloride resins. More specifically, the vinyl chloride resin molecules in the vicinity of the bonding interface are molten and diffused under heating, and show an adhesive property. Thus there is obtained a good bonding between two articles of the semi-gelatinous composition, or between the article of the composition and the article of the other known vinyl chloride resins. Such bonding can also be obtained between the cured articles.

This invention will now be detailed by referring to examples where the values of "percentage" and "part" are on the weight basis, unless otherwise indicated.

Example 1.—Composition comprising vinyl chloride resin, reactive plasticizer, unsaturated polyester, non-reactive plasticizer, vinyl monomer, polymerization initiator and thickening agent A 2-liter capacity, 4-neck flask equipped with a stirrer, a thermometer, a reflux condenser with a measuring apparatus of water content and a tube for introducing nitrogen gas was charged with 1.1 moles of neopentylglycol, 0.4 mole of isophthalic acid and 0.6 mole of maleic anhydride, and they were reacted at 150–180° C. for 4 hours under a nitrogen gas atmosphere and for another 4 hours at 200–220° C. while removing water formed by the reaction. Thus there was obtained an unsaturated polyester resin A characterized by an acid value of 16, a number average molecular weight of 1340 and an average degree of condensation of 13. Then, 40% of styrene and 0.01% of hydroquinone were added to the unsaturated polyester resin A and they were dissolved to form an unsaturated polyester resin solution A–1, each percentage being based on the resulting solution.

Separately, a polyvinyl chloride plastisol (a) was prepared by blending 100 parts of a vinyl chloride resin for plastisol having an average degree of polymerization of 1650 with 30 parts of di(2-ethylhexyl) phthalate and 30 parts of ethyleneglycol dimethacrylate, incorporating therein a polymerization initiator and a stabilizer for vinyl chloride resin, and defoaming the mixture under reduced pressure.

After 2% of magnesium oxide and 1% of benzoyl peroxide were added to a mixture of the unsaturated polyester resin solution A–1 and the polyvinyl chloride plastisol (a), the mixture was well blended by means of a mixer and it was heated at 50° C. for 1 hour, the fluidity of the mixture was lost and a semi-gelatinous solid with a low stickiness was obtained (Sample No. 1 of the composition of the invention). Comparative compositions (Sample Nos. 2 to 5) were prepared in the same manner. Results of tests of these sample compositions are shown in Table 1.

The composition of the invention is not very sticky and is easily handled in the form of a block. Further, in the composition of the invention the vinyl chloride resin was not separated during storage or curing, and a molded article prepared therefrom exhibited a low volume shrinkage and a good dimensional stability and was characterized by being self-extinguishing.

Example 2.—Composition comprising vinyl chloride resin, reactive plasticizer, unsaturated polyester resin, vinyl monomer, non-reactive plasticizer, polymerization initiator and thickening agent In the same reactor as used in Example 1, 0.6 mole of propyleneglycol, 0.5 mole of neopentylglycol, 0.5 mole of dimethyl terephthalate and 0.5 mole of maleic anhydride were reacted, and when the acid value of the reaction product reached 15, cooling was effected to obtain an unsaturated polyester resin B having a number average molecular weight of 1350 and an average degree of condensation of 14. Then, 40% of styrene and 0.01% of hydroquinone were added to the unsaturated polyester resin to form an unsaturated polyester resin solution B–1, each percentage being based on the resulting solution.

Separately, a polyvinyl chloride plastisol (b) was prepared by blending 100 parts of a vinyl chloride resin for plastisol with 40 parts of di-(2-ethylhexyl) phthalate, 60 parts of tetraethyleneglycol dimethacrylate and 3 parts of a composite stabilizer (Zn/Cd/Ba type) and defoaming the mixture under reduced pressure.

When 203 parts of the plastisol (b) were mixed with 50 parts of the unsaturated polyester resin solution B–1, 2.5 parts of benzoyl peroxide and 5 parts of beryllium oxide, the viscosity increased even at room temperature and 24 hours after mixing there was obtained a semi-gelatinous solid with low stickiness (Sample No. 7). A molded product obtained by heating this Sample at 120° C. for 20 minutes had an excellent dimensional stability and an appearance the same as the molded article prepared from Sample No. 1 of Example 1. The molded product was also excellent in physical properties and flame resistance with a low volume shrinkage.

Example 3.—Composition comprising vinyl chloride resin, reactive plasticizer, unsaturated polyester resin, vinyl monomer, polymerization initiator and thickening agent A polyvinyl chloride plastisol (c) was prepared by blending 100 parts of a vinyl chloride resin powder (average degree of polymerization of 1700) with 60 parts of trimethylolpropane trimethacrylate and 3 parts of a composite stabilizer for vinyl chloride resin and kneading them to disperse the additives into the polyvinyl chloride resin.

Separately, in the same reactor as used in Example 1, 1.1 moles of 1,6-hexanediol, 0.5 mole of isophthalic acid and 0.5 mole of maleic anhydride were reacted to obtain an unsaturated polyester resin C characterized by an acid value of 15, a number average molecular weight of 1440 and an average degree of condensation of 13. Then,

TABLE 1

|  | Sample No. 1 (this invention) | Comparison |  |  |  |  |
|---|---|---|---|---|---|---|
|  |  | Sample No. 2 | Sample No. 3 | Sample No. 4 | Sample No. 5 | Sample No. 6 |
| Recipe (parts): |  |  |  |  |  |  |
| Unsaturated polyester resin solution A–1. | 200 | 200 | 100 | 200 | 200 | 200. |
| Polyvinyl chloride plastisol (a): |  |  |  |  |  |  |
| Vinyl chloride resin for paste | 100 | 100 |  | 100 | 100 | 100. |
| Di-(2-ethylhexyl) phthalate | 30 | 30 |  |  | 60 | 30. |
| Ethyleneglycol dimethacrylate | 30 | 30 |  |  |  | 30. |
| Composite stabilizer for vinyl chloride resin (Zn/Cd/Ba type). | 3 | 3 |  | 3 | 3 | 3. |
| Magnesium oxide | 7.2 |  | 2 |  |  |  |
| Benzoyl peroxide | 3.6 | 3.6 | 1 | 3 | 3.6 | 3.6. |
| Properties: |  |  |  |  |  |  |
| State in container | Semi-gelatinous solid with low stickiness. | Liquid with a high flowability. | Semi-gelatinous solid with low stickiness. | Violent increase of viscosity and high rate of sedimentation of vinyl chloride resin. | Violent increase of viscosity and medium rate of sedimentation of vinyl chloride resin. | Mild increase of viscosity and low rate of sedimentation of vinyl chloride resin. |
| Cast product [1] (heating at 120° C. for 20 minutes). | Well cured | Well cured | Cracks, warps and twists. | Warps | Non-uniform curing. | Well cured. |
| Appearance | Good | Good | Good | Opaque and turbid. | Opaque and turbid. | Transparent. |
| Volume shrinkage (percent) | 4.5 | 4.5 | 9.1 |  |  |  |
| Hardness (Rockwell R scale) | 125 | 124 | 129 | 121 | 91 | 124. |
| Impact test (falling ball method) [2] | Unchanged |  | Destroyed | Destroyed | Destroyed | Unchanged. |
| Flame resistance | Self-extinguishing. |  | Easily combustible. |  |  |  |

[1] Disc having a diameter of 50 mm. and a thickness of 5 mm.
[2] A steel ball of 100 g. was let to fall on the sample from the height of 50 cm. (according to JIS K-6745).

the unsaturated polyester resin C was blended with 30% of styrene and 0.01% of hydroquinone to form an unsaturated polyester resin solution C–1, each percentage being based on the resulting solution. Sample No. 8 was prepared by adding 163 parts of the polyvinyl chloride plastisol (c) and 2.6 parts of benzoyl peroxide to 100 parts of the solution C–1 and further incorporating therein 5.2 parts of magnesium oxide. Sample No. 9 (comparison) was prepared by incorporating and dispersing 1 part of benzoyl peroxide and 2 parts of magnesium oxide into 100 parts of the unsaturated polyester solution C–1.

Both Sample No. 8 or No. 9 exhibited a gradual increase in viscosity even at room temperature. When the viscosity increase was promoted by heating at 40° C. for 1 hour, a semi-gelatinous solid was formed from either Sample No. 8 or No. 9.

Results of the examination of curing characteristics of Samples No. 8 and No. 9 are summarized in Table 2. The viscosity-increasing state and physical properties of cast products of these samples are also shown in Table 2.

In spite of low maximum exothermic reaction temperature, Sample No. 8 gave a cast product exhibiting high hardness, high tensile strength, high flexural strength, high modulus of elasticity and high heat distortion temperature. Thus, the cast product from Sample No. 8 was very excellent in mechanical strength and was characterized by a low volume shrinkage and a good self-extinguishing property.

Example 5.—Composition comprising vinyl chloride resin, reactive plasticizer, unsaturated polyester resin, vinyl monomer, polymerization initiator and thickening agent Pastes of Samples No. 10 and No. 11 were prepared in the same manner as adopted in preceding examples according to the formulations indicated in Table 4.

TABLE 4

| Formulation (parts) | Sample No. 10 (this invention) | Sample No. 11 (comparison) |
|---|---|---|
| Vinyl chloride resin for plastisol | 100 | 100 |
| Ethyleneglycol dimethacrylate | 60 | 60 |
| Unsaturated polyester resin solution C-1 | 300 | 300 |
| Stabilizer for vinyl chloride resin (Zn/Cd/Ba type) | 3 | 3 |
| Tert.-butyl perbenzoate | 4.6 | 4.6 |
| Calcium hydroxide | 23 | |

In the paste of Sample No. 10, the viscosity was gradually increased even at room temperature, and if the viscosity increase was promoted by heating at 50° C. for 1 hour, the paste was converted to a semi-gelatinous solid. When the paste of Sample No. 11 free of the thickening agent was allowed to stand still for a long time, the vinyl chloride resin tended to separate in the composition. In the cast product prepared from Sample No. 11, the deviation of mechanical properties was much greater than in the cast product from Sample No. 10 containing the thickening agent. Results of examination

TABLE 2

|  | Sample No. 8 (this invention) | Sample No. 9 (comparison) | Remarks |
|---|---|---|---|
| Curing characteristics: | | | |
| Time required for initiation of gelation (min.:sec.) | 8:02 | 7:47 | JIS-K 6901. |
| Minimum curing time (min.:sec.) | 10:55 | 10:50 | JIS K-6901. |
| Maximum exothermic reaction temperature (° C.) | 128 | 195 | JIS K-6901. |
| Viscosity-increasing state: | | | |
| Stickiness | Low | Low | |
| Hardness in viscosity-increased product | Semi-gelatinous | Semi-gelatinous | Almost equal. |
| Physical properties of cast product: | | | |
| Volume shrinkage (percent) | 3.0 | 9.1 | |
| Rockwell hardness (R scale) | 127 | 120 | ASTM D-785 |
| Tensile strength (kg./mm.²) | 4.68 | 3.87 | JIS K-6911. |
| Elongation (percent) | 2 | 2 | JIS K-6911. |
| Flexural strength (kg./mm.²) | 12.4 | 12.4 | JIS K-6911. |
| Modulus elasticity (kg./mm.²) | 415 | 350 | JIS K-6911. |
| Izod impact strength (kg. cm./mm.²) | 4.2 | 2.0 | JIS K-6911. |
| Heat distortion temperature (° C.) | 118 | 95 | ASTM D-648 (264 p.s.i.) |
| Flame resistance | Self-extinguishing. | Easily combustible. | JIS K-6911. |

Example 4.—Composition comprising vinyl chloride resin, reactive plasticizer, unsaturated polyester resin, vinyl monomer, polymerization initiator and thickening agent Cured products prepared from Samples No. 8 and No. 9 formed in Example 3 were subjected to (1) the boiling water immersion test, (2) the immersion test in 40% sulfuric acid at 70° C., (3) the immersion test in 15% caustic soda at 70° C. and (4) the xenon weather-ometer radiation test, and after these tests the flexural strength retention ratio was determined. Results are shown in Table 3, from which it is seen that the product of Sample No. 8 of this invention exhibited better chemical resistance and weatherproofing than the product of comparative Sample No. 9.

TABLE 3

| Flexural strength retention ratio (percent) | Sample No. 8 (this invention) | Sample No. 9 (comparison) |
|---|---|---|
| After immersion in boiling water for 500 hours | 78 | 52 |
| After immersion in 40% sulfuric acid at 70° C. for 30 days | 85 | 71 |
| After immersion in 15% caustic soda at 70° C. for 30 days | 65 | 32 |
| After xenon radiation for 1,000 hours | 91 | 85 |

(The specimen tested had a size of 25 mm. x 80 mm. x 3 mm.)

of deviation in mechanical properties are shown in Table 5.

Further, according to the method of JIS K-6911, 5.4, the moldability of Sample Nos. 10 and 11 was tested using a large mold of a dimension of 30 cm. x 30 cm. x 5 cm. and a mold wall thickness of 0.3 cm. The molded product from Sample No. 10 exhibited an excellent finished appearance, but the molded product from Sample No. 11 was inferior in surface smoothness and formation of shrinks, distortions and pinholes was observed. The molding was conducted at 140° C. under a pressure of 50 kg./cm.² for a heat-curing time of 5 minutes.

TABLE 5

|  | Sample No. 10 (this invention) | Sample No. 11 (comparison) | Remarks |
|---|---|---|---|
| State in container | Semi-solid without sedimentation of vinyl chloride resin. | Liquid with sedimentation of vinyl chloride resin. | Heat at 50° C. for 1 hour. |
| Cast product: | | | |
| Flexural strength (kg./mm.) | 12.0 | 12.1 | |
| (Deviation [1]) | (1.1) | (6.2) | |
| Modulus elasticity (kg./mm.²) | 410 | 415 | |
| (Deviation [1]) | (9) | (21) | |
| Flame resistance | Self-extinguishing. | Self-extinguishing. | |
| Moldability (press molding). | ○ (good) | △ (moderate) | JIS K-6911, 5.4. |

[1] The value of deviation is expressed by the difference between the maximum value and the minimum value when 5 specimens were tested.

Example 6.—Composition comprising vinyl chloride resin, reactive plasticizer, unsaturated polyester resin, vinyl monomer, polymerization initiator and thickening agent In the same manner as adopted in Example 1, a composition of Sample No. 12 was prepared according to the formulation indicated in Table 6. When the composition was allowed to stand still at room temperature for 24 hours, it became semi-gelatinous. Properties of the molded product obtained by curing it under heating were as excellent as those of the molded product formed from Example No. 8 of Example 3.

TABLE 6

| Formulation (parts): | Sample No. 12 (this invention) |
|---|---|
| Vinyl chloride resin for plastisol | 100 |
| Trimethylolpropane trimethacrylate | 100 |
| Unsaturated polyester resin solution B-1 | 400 |
| Stabilizer for vinyl chloride resin | 3 |
| Zinc acetate | 30 |
| Tert.-butyl perbenzoate | 6 |

Example 7.—Composition comprising vinyl chloride resin, reactive plasticizer, unsaturated polyester resin, polymerization initiator and thickening agent In the same reactor as used in Example 1, 0.4 mole of phthalic anhydride, 0.6 mole of maleic anhydride, 0.7 mole of neopentylglycol and 0.4 mole of ethyleneglycol were reacted to obtain an unsaturated polyester resin D having an acid value of 20, a number average molecular weight of 1160 and an average degree of condensation of 13. Then, an unsaturated polyester resin solution D-1 was prepared by dissolving 40 parts of the unsaturated polyester resin D into 60 parts of diallyl phthalate and adding 0.01 part of hydroquinone to the solution.

Using the thus formed unsaturated polyester resin solution D-1, a composition of Sample No. 13 was prepared in the same manner as in preceding examples according to the formulation indicated in Table 7.

The resulting composition took the form of a semi-gelatinous solid with low stickiness, and a molded product obtained by curing this composition at 140° C. for 30 minutes was as excellent as the molded product obtained from Sample No. 8 of Example 3 with respect to the volume shrinkage, mechanical and chemical properties.

TABLE 7

| Formulation (parts): | Sample No. 13 (this invention) |
|---|---|
| Vinyl chloride resin for plastisol | 100 |
| Trimethylolpropane trimethacrylate | 60 |
| Stabilizer (Zn/Cd/Ba liquid organic complex) | 3 |
| Tert.-butyl perbenzoate | 2 |
| Unsaturated polyester resin solution D-1 | 100 |
| Zinc acetate | 13 |

Example 8.—Composition comprising vinyl chloride resin, reactive plasticizer, unsaturated polyester resin, vinyl monomer, polymerization initiator and thickening agent 100 parts of the composition of Sample No. 11 prepared in Example 5 was incorporated with 20 parts of titanium dioxide and 120 parts of calcium carbonate, and they were well mixed in a kneader. Then, 80 parts of a glass chopped strand of 8 mm. in length, 1 part of benzoyl peroxide and 2 parts of calcium hydroxide were further incorporated in the mixture for a short period of time to form a bulk moldling compound (Sample No. 14). The compound was a little sticky just after preparation, but after it had been allowed to stand still for 24 hours, the stickiness was not at all observed and the handling of the compound was very easy.

The compound was press-molded at 140° C. under a pressure of 50 kg./cm.² for 3 minutes using a hot press molder. The flowability of the compound during the molding procedure was excellent and the surface of the resulting molded product was smooth. The molded product was characterized by a Rockwell hardness of 98 (M scale), a flexural strength of 6.8 kg./mm.² and a modulus of elasticity of 1020 kg./mm.².

Example 9.—Composition comprising vinyl chloride resin, reactive plasticizer, unsaturated polyester resin, vinyl monomer, polymerization initiator and thickening agent A resinous composition was prepared from 30 parts of a vinyl chloride resin for plastisol, 2 parts of a stabilizer (Cd/Ba/Zn liquid organic complex), 20 parts of diethyleneglycol dimethacrylate and 48 parts of the unsaturated polyester resin solution A-1. Sample Nos. 15, 16 and 17 were prepared by incorporating in the resinous composition magnesium oxide in amounts of 1 part, 2 parts and 3 parts, respectively. The resulting mixtures were well blended by means of a high speed mixer and then, the viscosity change was traced in each sample by employing a Brookfield viscometer. Results are shown in Table 8.

For comparison, the viscosity change was also traced in comparative compositions (Sample Nos. 18, 19 and 20) prepared by incorporating in the unsaturated polyester resin solution A-1 magnesium oxide in amounts of 1 part, 2 parts and 3 parts, respectively. Results are also shown in Table 8.

In the compositions of this invention, the viscosity was violently increased in 5–48 hours by the incorporation of magnesium oxide and the viscosity increase in the subsequent stage was very low. Further, they lost stickiness in 24–48 hours from the incorporation of magnesium oxide.

In contrast, in comparative unsaturated polyester resin compositions, the rate of the viscosity increase was much lower and even after 48–100 hours had passed from the incorporation of magnesium oxide, the compositions were still sticky.

TABLE 8

| | This invention | | | Comparison | | |
|---|---|---|---|---|---|---|
| | 15 | 16 | 17 | 18 | 19 | 20 |
| Recipe (parts): | | | | | | |
| Vinyl chloride resin for plastisol | 30 | 30 | 30 | | | |
| Stabilizer (Cd/Ba/Zn liquid organic complex) | 2 | 2 | 2 | | | |
| Diethyleneglycol dimethacrylate | 20 | 20 | 20 | | | |
| Unsaturated polyester resin solution A-1 | 48 | 48 | 48 | 100 | 100 | 100 |
| Magnesium oxide | 1 | 2 | 3 | 1 | 2 | 3 |
| Viscosity (poise): | | | | | | |
| Just after preparation | 20 | 20 | 20 | 5 | 5 | 5 |
| 5 hours after preparation | 50 | 100 | 1,000 | 16 | 18 | 20 |
| 10 hours after preparation | 160 | 500 | 3,400 | 22 | 35 | 50 |
| 24 hours after preparation | 600 | 2,100 | 10,000 | 30 | 55 | 300 |
| 48 hours after preparation | 2,600 | 4,400 | 13,000 | 60 | 100 | 5,0 |
| 100 hours after preparation | 3,200 | 5,400 | 18,000 | 1,500 | 4,500 | 14,000 |

Example 10.—Composition comprising vinyl chloride resin, reactive plasticizer, unsaturated polyester resin, vinyl monomer, polymerization initiator and thickening agents In the same reactor as used in Example 1, 1 mole of isophthalic acid, 1 mole of maleic anhydride, 1.08 moles of propyleneglycol, 0.11 mole of dipropyleneglycol and 0.97 mole of neopentylglycol were reacted to obtain an unsaturated polyester resin E having an acid value of 29, a number average molecular weight of 1460 and an average degree of condensation of 15. Then, 30% of styrene and 0.01% of hydroquinone were added to the unsaturated polyester resin to form an unsaturated resin solution E-1, each percentage being based on the resulting solution.

A resinous composition was prepared from 30 parts of a vinyl chloride resin for paste, 2 parts of a stabilizer (Cd/Ba/Zn liquid organic complex), 20 parts of diethyleneglycol dimethacrylate and 48 parts of the unsaturated polyester resin solution E-1.

A liquid compound was prepared by mixing 100 parts of the resinous composition with 30 parts of calcium carbonate, 5 parts of titanium dioxide, 10 parts of styrene monomer and 1 part of benzoyl peroxide in a mixer and further incorporating therein 2 parts of magnesium oxide.

Just after the preparation, this liquid compound was coated thinly on a polyethylene film by means of a bar coater and then glass rovings cut into a length of 1 inch were uniformly scattered on the coated film. Then, another polyethylene film coated on the above compound was placed on the glass-roving-scattered film with the coated surface being applied thereon, and the assembly was defoamed by means of a roll. Thus there was obtained a sheet molding compound (Sample No. 21), in which the wettability between the cut glass roving and the resin compound was good.

After 24 hours had passed from the preparation of the sheet molding compound, it was not sticky even when the polyethylene film was peeled off. Further, the compound was very flexible. The glass fiber content in the compound was 35%. This sheet molding compound was cut into sheets of 25 cm. x 25 cm., and eight sheets were overlapped and press-molded at 140° C. under a pressure of 150 kg./cm.$^2$ for 3 minutes. The resulting molded product had a smooth surface and mechanical properties characterized by a Rockwell hardness of 102 (M scale), a tensile strength of 14.2 kg./mm.$^2$, a flexural strength of 24.1 kg./mm.$^2$ and a modulus of elasticity of 1150 kg./mm.$^2$.

Example 11.—Composition comprising vinyl chloride resin, reactive plasticizer, unsaturated polyester resin, vinyl monomer, non-reactive plasticizer, polymerization initiator, thickening agent and bubbling material In the same manner as in Example 1, a mixture of the polyvinyl chloride plastisol (a) and the unsaturated polyester resin solution A-1 was prepared. The mixture was incorporated with Bakelite Phenolic Microballoons (phenol resin microballoons containing nitrogen gas occluded therein. Trade name manufactured by Union Carbide Corporation), and magnesium oxide and benzoyl peroxide were further incorporated therein. (Sample No. 22.)

For comparison, compositions free of magnesium oxide (Sample No. 23) or free of the polyvinyl chloride plastisol (a) (Sample Nos. 24 and 25) were prepared in the same manner as above. Formulations of these samples are shown in Table 9.

Each example was cast into a sheet of 20 cm. in length, 30 cm. in width and 5 mm. in thickness and cured at 140° C. for 20 minutes in a heating furnace.

In Sample No. 22 of the composition of the invention, when it was allowed to stand still at room temperature for 24 hours, it became semi-gelatinous, and even after it had been allowed to stand still for a long period of time, separation of the microballoons did not occur and the composition maintained the homogeneous state. The cast product of Sample No. 22 was uniformly foamed by heating, and the resulting molded product took a brown color appearance and exhibited a ratio of foaming of about 2.5. In the periphery portion contacted with the mold, a relatively uniform skin layer of a thickness of about 1.5 mm. was formed, and in the interior portion, there was formed a cellular structure composed of uniformly distributed, stockade-like continuous cells of a diameter of 0.5–1.0 mm.

Sample No. 23 took a liquid form and microballoons were easily separated during storage, and when it was cast, cured and foamed, there was obtained a product similar to that prepared from Sample No. 22 but it was inferior to the product from Sample No. 22 with respect to the foam ratio of foaming and cell uniformity. When Sample Nos. 24 and 25 were heated and cured, uniform foaming such as seen in Sample Nos. 22 and 23 was not brought about but violent foaming was partially caused. Products from Sample Nos. 24 and 25 exhibited an extreme shrinkage, and cracks and warps were observed here and there. Accordingly, these products were of no practical value.

TABLE 9

| Formulation (parts) | 22 (this invention) | Comparison | | |
|---|---|---|---|---|
| | | 23 | 24 | 25 |
| Unsaturated polyester resin solution A-1 | 200 | 200 | 100 | 100 |
| Vinyl chloride resin for plastisol | 100 | 100 | | |
| Di-(2-ethylhexyl) phthalate | 30 | 30 | | |
| Ethyleneglycol dimethacrylate | 30 | 30 | | |
| Stabilizer (Cd/Ba/Zn liquid organic complex) | 3 | 3 | | |
| Phenolic microballoons | 10 | 10 | 4 | 4 |
| Benzoyl peroxide | 3 | 3 | 1 | 1 |
| Magnesium oxide | 7.2 | | 2 | |

Example 12.—Composition comprising vinyl chloride resin, reactive plasticizer, unsaturated polyester, vinyl monomer, polymerization initiator, thickening agent and bubbling material In the same reactor as used in Example 1, 1 mole of isophthalic acid, 1 mole of maleic anhydride, 1 mole of neopentylglycol and 1 mole of diethyleneglycol were reacted to obtain an unsaturated polyester resin F having an acid value of 25, a number average molecular weight of 2460 and an average degree of condensation of 23. Then, 30% of styrene and 0.01% of hydroquinone were added to the unsaturated polyester resin to form an unsaturated resin solution F-1, each percentage being based on the resulting solution.

A resinous composition was prepared by mixing 60 parts of the unsaturated polyester resin solution F-1, 20 parts of a vinyl chloride resin for plastisol, 12 parts of ethyleneglycol dimethacrylate, 0.6 part of a stabilizer (Cd/Ba/Zn type), 0.9 part of tert.-butyl perbenzoate, 10 parts of titanium dioxide, 40 parts of sodium borosilicate microballoons containing air occluded therein ("Glass Microballoon, IG-101" trade name manufactured by Emerson & Cuming Co.) and 1 part of zinc stearate in a kneader, and then the composition was further mixed in a short time with 40 parts of glass chopped strands cut into 8 mm. length, 1 part of tert.-butyl perbenzoate and 1 part of magnesium oxide to form a bulk molding compound (Sample No. 26).

Just after the preparation, the compound was a little sticky, but 24 hours after preparation it was not sticky at all, and it was handled very easily.

The compound was press-molded at a temperature of 140° C. under a pressure of 50 kg./cm.$^2$ for 3 minutes by a hot press molder. The fluidity of the compound during the molding operation was good and the resulting molded article was light and had a smooth surface.

Example 13.—Composition comprising vinyl chloride resin, reactive plasticizer, unsaturated polyester resin, polymerization initiator, thickening agent and bubbling material A resin dispersion was prepared from 30 parts of a vinyl chloride resin for plastisol, 2 parts of a stabilizer (Cd/Ba/Zn liquid organic complex), 20 parts of trimethylolpropane trimethacrylate and 48 parts the unsaturated polyester resin D-1.

100 parts of this resin dispersion were blended by a mixer with 5 parts of titanium dioxide, 20 parts of Glass Microballoon 1G-101, 10 parts of styrene monomer and 1 part of tert.-butyl perbenzoate. Then, the mixture was further incorporated with 2 parts of magnesium oxide to form a liquid compound, from which a sheet molding compound (Sample No. 27) was prepared in the same manner as adopted in Example 10.

This sheet molding compound and a molded product therefrom exhibited properties similar to those of the compound and molded product of Example 10. But the density of the molded product from Sample No. 27 was lower than that of the molded product of Example 10.

Example 14.—Composition comprising vinyl chloride resin, reactive plasticizer, unsaturated polyester resin, vinyl monomer, polymerization initiator, thickening agent and bubbling material In the same reactor as used in Example 1, 1 mole of isophthalic acid, 1 mole of maleic anhydride, 1 mole of neopentylglycol and 1 mole of 1,6-hexanediol were reacted to obtain an unsaturated polyester resin G having an acid value of 28, a number average molecular weight of 2000 and an average degree of condensation of 18. Then, 30% of styrene and 0.01% of hydroquinone were added to the unsaturated polyester resin to form an unsaturated polyester resin solution G-1, each percentage being based on the resulting solution.

Then the composition of the following formulation (Sample No. 28) was well mixed under agitation and defoamed under reduced pressure. Then, the composition was coated in a thickness of 4 mm. on a piece of plywood, and a mirror plate was disposed with a space of 4 mm. left above the coated surface. Then, the heating was effected at 150° C. for 10 minutes using a hot press. Thus, the coated composition was foamed at a foam ratio of foaming of 2 and there was obtained a laminate having a cellular layer of 8 mm. thickness.

Formulation of Sample No. 28 (parts):

| | |
|---|---|
| Vinyl chloride resin for plastisol (average degree of polymerization of 1700) | 100 |
| Reactive plasticizer (trimethylolpropane trimethacrylate) | 60 |
| Unsaturated polyester resin solution G-1 | 200 |
| Stabilizer (same as used in Example 1) | 7 |
| Bubbling material ("Bakelite Phenolic Microballoon" manufactured by Union Carbide Corporation) | 10 |
| Tert.-butyl perbenzoate | 5 |
| Carbon black | 5 |
| Magnesium oxide | 7.8 |

The properties of the resulting laminate plate were examined, and results are shown in Table 10. For comparison, laminated plywood plates obtained by employing conventional vinyl chloride (Sample No. 29) and polyester (Sample No. 30) sheets were also tested and the results are shown in Table 10.

TABLE 10

| | Sample No. 28 (this invention) | Comparison | |
|---|---|---|---|
| | | Sample No. 29 | Sample No. 30 |
| Surface hardness (Barcol hardness tester) | 80 | 34 | 90. |
| Surface abrasion coefficient (Taber abraser) | 1.5 | 10.5 | 3.5. |
| Heat conductivity (10⁻⁴ cal./sec./cm.²/° C.) | 0.9 | 5.0 | |
| Sound-adsorbing property | Moderate | Low | Low. |
| Combustibility (central portion of the laminated plate surface was exposed to flame). | Difficultly combustible and self-extinguishing. | Difficultly combustible and self-extinguishing. | Easily combustible. |

Example 15.—Composition comprising vinyl chloride resin, reactive plasticizer, unsaturated polyester resin, vinyl monomer, non-reactive plasticizer, thickening agent and polymerization initiator A mixture of the following formulation was prepared:

Components: Parts

| | |
|---|---|
| Vinyl chloride resin (average degree of polymerization of 1700) | 100 |
| Reactive plasticizer (diallyl phthalate) | 30 |
| Unsaturated polyester resin solution A-1 | 50 |
| Dioctyl phthalate (DOP) | 30 |
| Benzoyl peroxide | 2 |
| Stabilizer for vinyl chloride resin (Zn/Cd/Ba type) | 5 |
| Magnesium oxide | 4.6 |

The mixture was well agitated and cast on a plane plate. Then it was heated at 150° C. for 5 minutes to obtain a sheet-like molded article of 3 mm. thickness. Then, it was overlapped with a vinyl chloride sheet of 3 mm. thickness, and the assembly was heated at 160–170° C. for 3 minutes by a hot press, whereby the vinyl chloride resin contained in the sheet-like molded article and the vinyl chloride resin contained in the vinyl chloride sheet were molten and diffused in each other and thus both were bonded together. In case the bonded area was relatively small, the bonding was accomplished conveniently by application of high frequency or ultrasonic wave.

Example 16.—Composition comprising vinyl chloride resin, reactive plasticizer, unsaturated polyester resin, non-reactive plasticizer, polymerization initiator and thickening agent An unsaturated polyester resin solution A-2 was prepared by incorporating 0.01 part of hydroquinone in a solution of 60 parts of the unsaturated polyester resin A prepared in Example 1 in 40 parts of ethyleneglycol dimethacrylate. 200 parts of the unsaturated polyester resin solution A-2 was incorporated with 163 parts of the polyvinyl chloride plastisol (a) prepared in Example 1, 2 parts of magnesium oxide and 3.6 parts of benzoyl peroxide, and the mixture was well blended by a mixer and heated at 50° C. for 1 hour. Thus, the fluidity was lost in the mixture and there was obtained a semi-gelatinous solid with a low stickiness. From this solid a cast product was prepared in the same manner as in Example 1 and its properties were evaluated. As a result it was found that the cast product had a volume shrinkage of 4.1% and a hardness (Rockwell R scale) of 129. The product had an excellent appearance, impact resistance and self-extinguishing property as the cast product prepared from Sample No. 1 of Example 1.

Example 17.—Composition comprising vinyl chloride resin, reactive plasticizer, unsaturated polyester resin, non-reactive plasticizer, polymerization initiator, thickening agent and bubbling material In the same manner as in Example 16, a mixture of 163 parts of the polyvinyl chloride plastisol (a) and 200 parts of the unsaturated polyester resin solution A-2 was prepared, and the mixture was blended with 10 parts of the shirasu-glass microballoons (manufactured by Kyusyu Kogyo Shikenjo) and then with 3 parts of benzoyl peroxide and 7.2 parts of magnesium oxide.

Just after the preparation, the mixture was fluid and the microballoons tended to float in the upper portion of the mixture. However, when the mixture was allowed to stand still at room temperature for 24 hours, the viscosity was increased and the mixture was in the semi-gelatinous state, and after the semi-gelatinous mixture was uniformly blended by stirring, the microballoons did not float in the upper portion but the homogeneous state was maintained. The mixture was cast, heated and cured under the same conditions as in Example 11. Thus, there was obtained a molded foam product having a dense skin layer in the peripheral portion contacted with the mold, and uniform, stockade-like cells in the interior portion. The foam product had a foam ratio of foaming of about 1.8 and, as compared with foam products of comparative Sample Nos. 23, 24 and 25 prepared in Example 11, the foam product of this example was as excellent as the foam product of Sample No. 22 prepared in Example 11 with respect to the cellular structure and the reproducibility of the ratio of foaming.

Example 18.—Composition comprising vinyl chloride resin, reactive plasticizer, unsaturated polyester resin, vinyl monomer, non-reactive plasticizer, polymerization initiator, thickening agent and bubbling material Compositions of Sample No. 31 (this invention), Sample No. 32 (comparison), Sample No. 33 (comparison) and Sample No. 34 (comparison) were prepared in the same manner as Sample Nos. 22, 23, 24 and 25 were prepared in Example 11 by employing instead of the phenolic microballoons zeolite saturated with carbon dioxide gas (Molecular Sieve manufactured by Union Carbide Corporation). The states of the thus formed compositions and the foaming states of cured products from these compositions were similar to those in Example 11, and the composition of this invention (Sample No. 31) gave most excellent results. In zeolite-containing compositions comprising the unsaturated polyester resin alone as the resin component (Sample Nos. 33 and 34 corresponding Sample Nos. 24 and 25 in Example 11), the foaming state was extremely bad. In the foam product of Sample No. 31 the ratio of foaming was about 2, the thickness of the skin layer was 1–1.5 mm. and the size of stockade-like cells formed in the interior portion was 0.2–1.5 mm. In this foamed product the cell distribution was a little non-uniform.

What we claim is:

1. A thermosetting resinous composition which comprises 5–60% by weight of a vinyl chloride resin, 5–60% by weight of an unsaturated polyester resin, not more than 60% by weight of a reactive plasticizer, 0.1–10% by weight of a thickening agent which is at least one compound selected from the group consisting of beryllium oxide, magnesium oxide, strontium oxide, barium oxide, lead oxide, lithium hydroxide, sodium hydroxide, potassium hydroxide, rubidium hydroxide, cesium hydroxide, francium hydroxide, beryllium hydroxide, magnesium hydroxide, calcium hydroxide, strontium hydroxide, barium hydroxide and lead hydroxide, and 0.2–3% by weight of a polymerization initiator.

2. The thermosetting resinous composition in accordance with claim 1, wherein the reactive plasticizer is incorporated in an amount not more than 50% by weight and a non-reactive plasticizer is further incorporated in an amount not more than 50% by weight.

3. The thermosetting resinous composition in accordance with claim 1, wherein the reactive plasticizer is incorporated in an amount not more than 50% by weight and a vinyl monomer is further incorporated in an amount not more than 40% by weight.

4. The thermosetting resinous composition in accordance with claim 3, wherein a non-reactive plasticizer is incorporated in an amount not more than 50% by weight.

5. The thermosetting resinous composition in accordance with claim 1, wherein the vinyl chloride resin is a powdery vinyl chloride resin having a polymerization degree of 500 to 2500 and an average particle size of 0.05 to 50 microns.

6. The thermosetting resinous composition in accordance with claim 1, wherein the unsaturated polyester resin has an average condensation degree of at least 4 and a number average molecular weight of at least 1000.

7. The tthermosetting resinous composition in accordance with claim 6, wherein the polyhydric alcohol component of the unsaturated polyester resin comprises neopentylglycol or a combination of at least 30 mole percent of neopentylglycol and a balance of at least one other polyhydric alcohol selected from the group consisting of ethyleneglycol, diethyleneglycol, propyleneglycol dipropyleneglycol and 1,6-hexanediol.

8. The thermosetting resinous composition in accordance with claim 6, wherein the polyhydric alcohol component of the unsaturated polyester resin comprises 1,6-hexanediol or a combination of at least 30 mole percent of 1,6-hexanediol and a balance of at least one other polyhydric alcohol selected from the group consisting of ethyleneglycol, diethyleneglycol, propyleneglycol, dipropyleneglycol and neopentylglycol.

9. The thermosetting resinous composition in accordance with claim 1, wherein the reactive plasticizer is at least one compound represented by the formula:

wherein A is a residue of a compound having at least two hydroxyl groups at molecule ends, or a compound having at least one ester or ether linkage in a molecule and at least two terminal hydroxyl groups; X stands for a hydrogen or halogen atom or an alkyl group having one to two carbon atoms; and $n$ and $m$ are integers of 1 to 3.

10. The thermosetting resinous composition in accordance with claim 3, wherein the vinyl monomer is at least one compound selected from the group consisting of styrene, vinyl acetate, methyl methacrylate, butyl acrylate, chlorostyrene, divinyl benzene and acrylonitrile.

11. The thermosetting resinous composition in accordance with claim 1, which comprises a reinforcing material selected from the group consisting of asbestos, carbon fibers, glass fibers, boron fibers, metallic fibers, synthetic fibers and natural fibers.

12. A molded article prepared from the thermosetting resinous composition as set forth in claim 1.

13. A thermosetting foamable resinous composition which comprises 5–60% by weight of a vinyl chloride resin, 5–60% by weight of an unsaturated polyester resin, not more than 60% by weight of a reactive plasticizer, 0.1–10% by weight of a thickening agent, 0.2–3% by weight of a polymerization initiator and 1–50% by weight of a bubbling material.

14. The thermosetting foamable resinous composition in accordance with claim 13, wherein the reactive plasticizer is incorporated in an amount not more than 50% by weight and a non-reactive plasticizer is incorporated in an amount not more than 50% by weight.

15. The thermosetting foamable resinous composition in accordance with claim 14, wherein the reactive plasticizer is incorporated in an amount not more than 50% by weight and a vinyl monomer is incorporated in an amount of not more than 40% by weight.

16. The thermosetting foamable resinous composition in accordance with claim 14, wherein a non-reactive plasticizer is incorporated in amount of not more than 50% by weight.

17. The thermosetting foamable resinous composition in accordance with claim 13, wherein the vinyl chloride resin is a powdery vinyl chloride resin having a polymerization degree of 500 to 2500 and an average particle size of 0.05 to 50 microns.

18. The thermosetting foamable resinous composition in accordance with claim 13, wherein the unsaturated polyester resin has an average condensation degree of at least 4 and a number average molecular weight of at least 1000.

19. The thermosetting foamable resinous composition in accordance with claim 18, wherein the polyhydric alcohol component of the unsaturated polyester resin comprises neopentylglycol or a combination of at least 30 mole percent of neopentylglycol and a balance of at least one other polyhydric alcohol selected from the group consisting of ethyleneglycol, diethyleneglycol, propyleneglycol dipropyleneglycol and 1,6-hexanediol.

20. The thermosetting foamable resinous composition in accordance with claim 18, wherein the polyhydric alcohol component of the unsaturated polyester resin comprises 1,6-hexanediol or a combination of at least 30 mole percent of 1,6-hexanediol and a balance of at least one other polyhydric alcohol selected from the group consisting of ethyleneglycol, diethyleneglycol, propyleneglycol, dipropyleneglycol and neopentylglycol.

21. The thermosetting foamable resinous composition in accordance with claim 13, wherein the reactive plasticizer is at least one compound represented by the formula:

wherein A is a residue of a compound having at least two hydroxyl groups at molecule ends, or a compound having at least one ester or ether linkage in a molecule and at least two terminal hydroxyl groups; X stands for a hydrogen or halogen atom or an alkyl group having one to two carbon atoms; and $n$ and $m$ are integers of 1 to 3.

22. The thermosetting foamable resinous composition in accordance with claim 15, wherein the vinyl monomer is at least one compound selected from the group consisting of styrene, vinyl acetate, methyl methacrylate, butyl acrylate, chlorostyrene, divinyl benzene and acrylonitrile.

23. The thermosetting foamable resinous composition in accordance with claim 13, wherein the thickening agent is at least one one compound selected from the group consisting of beryllium oxide, magnesium oxide, strontium oxide, barium oxide, lead oxide, lithium hydroxide, sodium hydroxide, potassium hydroxide, rubidium hydroxide, cesium hydroxide, francium hydroxide, beryllium hydroxide, magnesium hydroxide, calcium hydroxide, strontium hydroxide, barium hydroxide and lead hydroxide.

24. The thermosetting foamable resinous composition in accordance with claim 13, wherein the bubbling material is selected from fine particles containing a gas and being capable of discharging the gas at temperatures below the gelation temperature of the composition.

25. The thermosetting foamable resinous composition in accordance with claim 13, which comprises a reinforcing material selected from the group consisting of asbestos, carbon fibers, glass fibers, boron fibers, metallic fibers, synthetic fibers and natural fibers.

26. A molded article prepared from the thermosetting foamable resinous composition as set forth in claim 13.

References Cited
UNITED STATES PATENTS

| | | | |
|---|---|---|---|
| 3,260,688 | 7/1966 | Watanabe et al. | 260—2.5 N |
| 3,227,665 | 1/1966 | Fourcade et al. | 260—2.5 N |
| 3,642,683 | 2/1972 | Fry | 260—2.5 N |
| 3,232,893 | 2/1966 | Salgado et al. | 260—2.5 N |

MURRAY TILLMAN, Primary Examiner

M. FOELAK, Assistant Examiner

U.S. Cl. X.R.

260—2.5 P, 16, 17 R, 17 A, 17.4 GC, 30.6 R, 31.4 R, 31.8 M, 31.8 XA, 31.8 HA, 824 R, 824 EP, 827, 835, 836, 842, 847, 857 PE, 857 UN, 858, 859 PV, 861, 862, 863, 865, 872, 873